(12) United States Patent
Ishii et al.

(10) Patent No.: US 9,726,842 B2
(45) Date of Patent: Aug. 8, 2017

(54) OPTICAL SOURCE FOR COHERENT TRANSCEIVER

(71) Applicants: Sumitomo Electric Industries, Ltd., Osaka-shi (JP); Sumitomo Electric Device Innovations, Inc., Yokohama-shi (JP)

(72) Inventors: Kuniyuki Ishii, Yokohama (JP); Hiromi Kurashima, Yokohama (JP); Takashi Kondo, Yokohama (JP)

(73) Assignees: Sumitomo Electric Industries, Ltd., Osaka-shi (JP); Sumitomo Electric Device Innovations, Inc., Yokohama-shi (JP)

( * ) Notice: Subject to any disclaimer, the term of this patent is extended or adjusted under 35 U.S.C. 154(b) by 0 days.

(21) Appl. No.: 15/096,636

(22) Filed: Apr. 12, 2016

(65) Prior Publication Data

US 2016/0308329 A1    Oct. 20, 2016

Related U.S. Application Data

(60) Provisional application No. 62/149,186, filed on Apr. 17, 2015.

(51) Int. Cl.
*G02B 6/42* (2006.01)

(52) U.S. Cl.
CPC ........ *G02B 6/4281* (2013.01); *G02B 6/4246* (2013.01); *G02B 6/4278* (2013.01); *G02B 6/4292* (2013.01)

(58) Field of Classification Search
CPC ....... G02B 6/42; H01S 3/0933; H01S 3/0941; H01S 5/00; H01S 5/022
See application file for complete search history.

(56) References Cited

U.S. PATENT DOCUMENTS

| 9,264,037 B2* | 2/2016 | Stark ..................... G06F 3/0202 |
| 2003/0147601 A1* | 8/2003 | Bartur ................. G02B 6/4246 385/92 |

FOREIGN PATENT DOCUMENTS

| JP | 2004-327173 A | 11/2004 |
| JP | 2009-146992 A | 7/2009 |

* cited by examiner

*Primary Examiner* — Dung Nguyen
(74) *Attorney, Agent, or Firm* — Venable LLP; Michael A. Sartori; Laura G. Remus

(57) ABSTRACT

An optical source that implements a wavelength tunable laser diode (t-LD) and a Mach-Zehnder (MZ) modulator within a single package is disclosed. The optical source, which outputs a modulated signal beam and a local beam of a continuous wave (CW), accompanies a control circuit mounted on several circuit boards. Only one of the circuit boards is rigidly mounted on the housing of the optical source. Rest of the circuit boards is moderately fixed to the housing through the rigidly fixed circuit board to suppress stresses caused in the housing and the circuit boards when the optical source is rigidly installed in the host system.

12 Claims, 17 Drawing Sheets

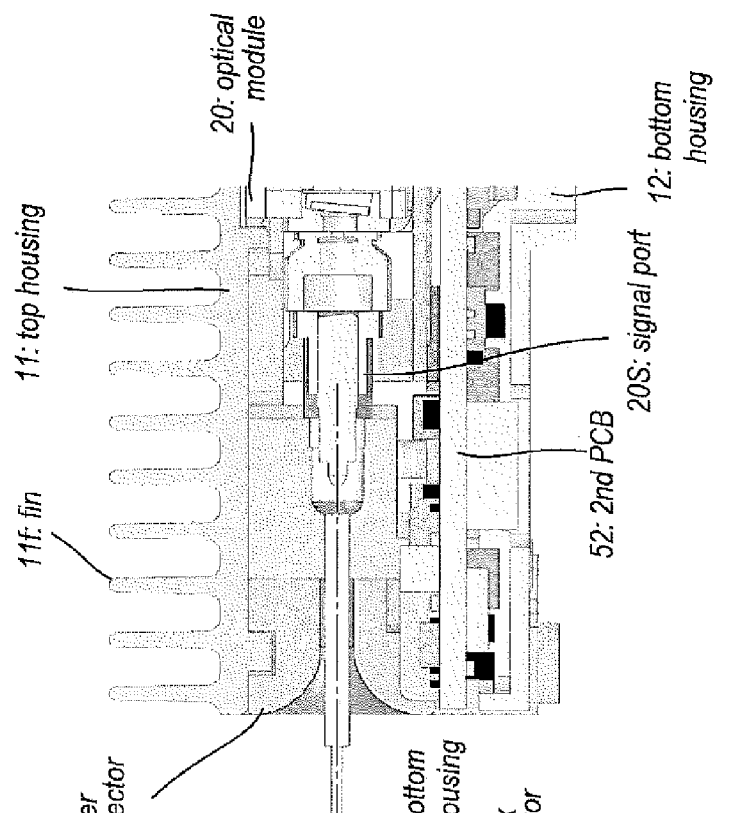
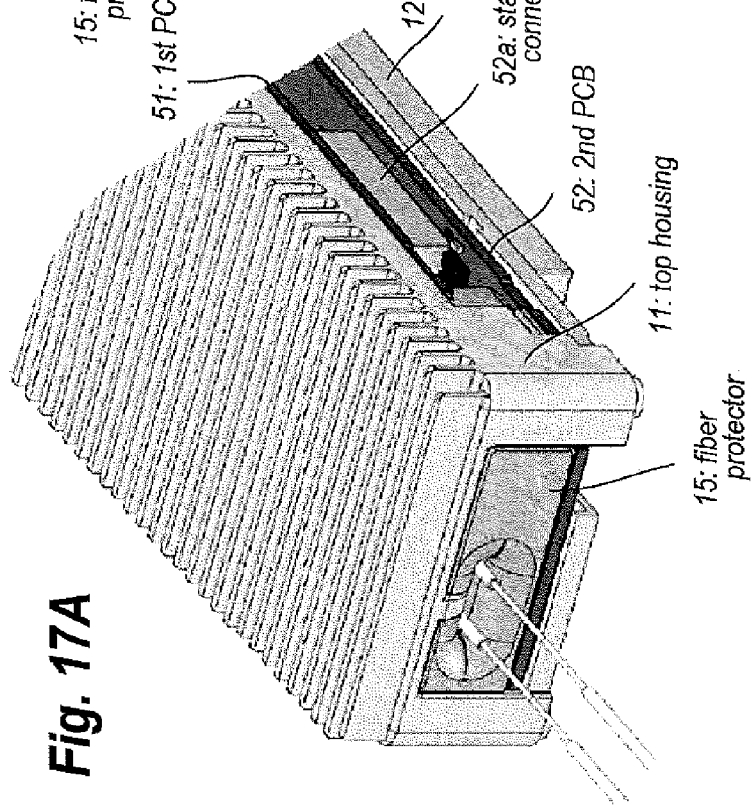

OPTICAL SOURCE FOR COHERENT TRANSCEIVER

CROSS-REFERENCE TO RELATED APPLICATIONS

This application claims the priority under 35 U.S.C. §119 of U.S. Provisional Application Ser. No. 62/149,186, filed on Apr. 17, 2015, the contents of which is relied upon and incorporated herein by reference in its entirety.

BACKGROUND

Field

The present application relates to an optical source, in particular, the present application relates to an optical source applicable to a coherent optical transceiver.

Related Background Art

A Japanese Patent Application laid open No. 2009-146992A has disclosed an optical module that installs a wavelength tunable laser diode (hereafter denoted as t-LD) for emitting continuous wave (CW) light and an optical modulator that modulates the CW light emitted from the t-LD. A feature of the optical module is that the optical modulator and the t-LD are disposed side by side within a housing, and optically coupled with an inner fiber.

Another Japanese Patent Application laid open No. 2004-327173A has disclosed an electrical connector of a surface mountable type. The electrical connector disclosed therein is mounted on the circuit board such that a receptacle thereof exposes an opening upward to receive a plug vertically inserted thereto. Thus, the electrical connector realizes the arrangement of the double-decker circuit board.

One type of optical transceivers has been known as the coherent transceiver that installs an optical module having both of a t-LD and an optical modulator. The t-LD emits a CW light with a preset wavelength and the optical modulator modulates this CW light. The optical module directly outputs the CW light as the local source used in a receiver unit of the optical transceiver, and indirectly outputs, through the optical modulator, the modulated light as a transmitting signal in a transmitter unit of the optical transceiver. In such an optical module, a wavelength of the CW light currently output from the t-LD is necessary to be precisely detected, and matched with a designed wavelength. The optical module is necessary, when the optical modulator has the arrangement of the Mach-Zehnder (MZ) type made of semiconductor material, to control a phase difference between two optical beams entering the MZ modulator, and to set optical power output from the optical modulator in a designed level. Thus, the optical modulator is inevitable to provide a circuit, in addition to a driving circuit that processes modulation signals entering the optical modulator, to control such various parameters in a DC and/or a low frequency (LF) mode. Moreover, such control circuits are requested to communicate with or to be commanded from the host system installed within the optical transceiver, or provided outside of the optical transceiver.

Meanwhile, an eager and continuous request to make an optical module in compact and to save power consumption becomes further strengthened. The optical module installing the t-LD and the optical modulator, in spite of intricate controls thereof and resultant expanded circuit sizes, is necessary to be formed in compact and simple. One solution is to use a specific electrical connector, which is often called as a stack connector. The stack connector, which has the arrangement of the surface mountable type, may stack two or more printed circuit board (PCB) without other components, such as flexible printed circuit boards (PCBs). However, as the number of the control parameters for the optical module increases, which means that the stack connector extracting the control signals from the optical module provides a number of pins, a precise arrangement of the stack connector on the circuit board becomes necessary.

SUMMARY

An aspect of the present application relates to an optical source mounted on a host system, or installed in a coherent optical transceiver. The optical source includes an optical module, at least two printed circuit boards (PCBs), a surface mountable connector, and a housing. The optical module implements a semiconductor laser diode (LD) and an optical modulator. The PCBs, which mount circuits for operating the LD and the optical modulator thereon, are electrically connected through a surface mountable connector. The housing installs the optical module and the PCBs therein. A feature of the optical source of the present application is that only one of the PCBs mounts another surface mountable connector to be connected to the host system, and the only one of the PCBs is rigidly fixed to the housing but the optical module and a rest of the only one of the PCBs are flexibly mounted on the housing.

BRIEF DESCRIPTION OF THE DRAWINGS

The foregoing and other purposes, aspects and advantages will be better understood from the following detailed description of a preferred embodiment of the invention with reference to the drawings, in which:

FIG. 17A is a perspective view of an optical source modified from the optical source shown in FIG. 1, and FIG. 17B shows a cross section taken along a longitudinal axis of the optical source extending in parallel to the optical axis of the local port and the signal port.

DETAILED DESCRIPTION

Next, some embodiments according to the present invention will be described as referring to drawings. In the description of the drawings, numerals or symbols same with or similar to each other will refer to elements same with or similar to each other without duplicating explanations.

Figure 1:
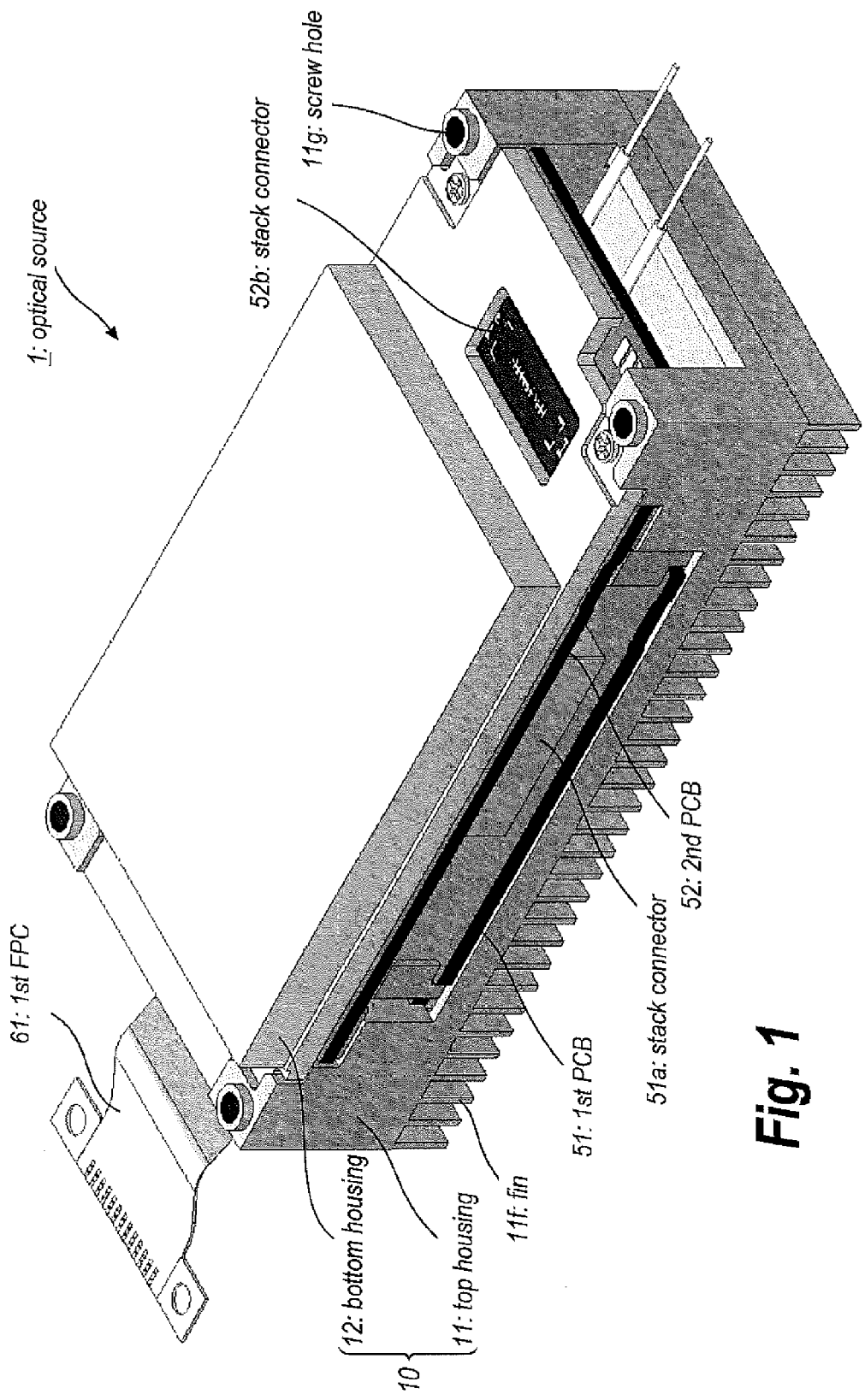
FIG. 1 shows an outer appearance of an optical source according to an embodiment of the present application.
Figure 2:
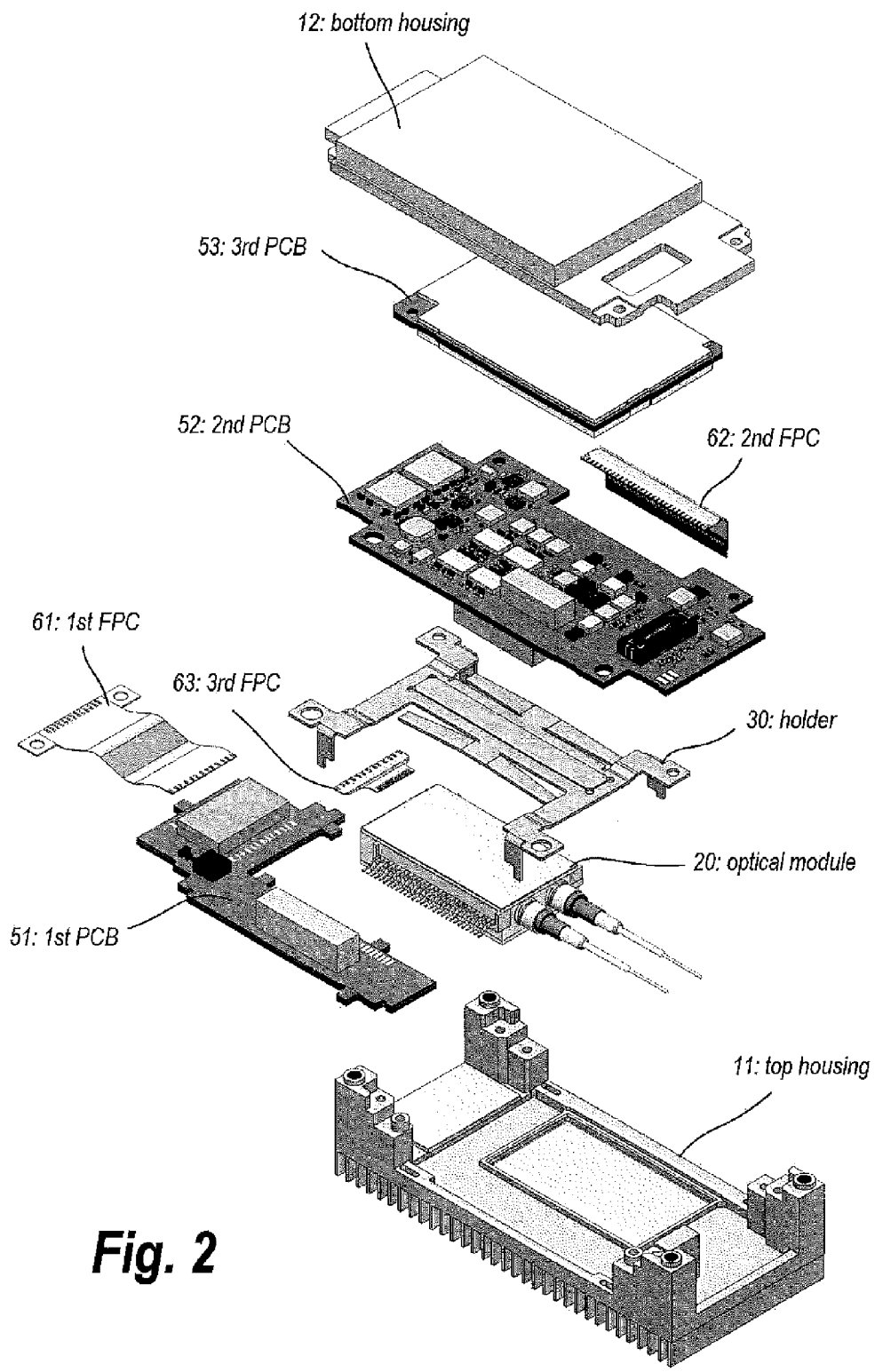
FIG. 2 is an exploded view of the optical source shown in FIG. 1.

FIG. 1 shows an outer appearance of an optical source 1 according to the present application and FIG. 2 is an exploded view of the optical source 1 shown in FIG. 1. FIGS. 1 and 2 illustrate the optical source 1 in upside down. The optical source 1, as shown in FIG. 2, has a housing 10 primarily formed by a top housing 11 and a bottom housing 12. The optical source 1 further includes in a space formed between the top housing 11 and the bottom housing 12, first to third printed circuit board (PCBs), 51 to 53, an optical module 20 accompanied with first to third flexible printed circuit (FPC) boards, 61 to 63, and a holder 30. The housing 10 has a rectangular shape with a plurality of fins 11f in a top of the top housing 11. As described later, one of key features of the optical source 1 according to the present embodiment is that only the second PCB 52 that mounts a stack connector 52b to be mated with another stack connector provided on a host system is rigidly assembled with the top housing 11, and the top hosing 11 is also rigidly mounted on the host system by screws fastening four corners of the top housing 11. The other members, namely, the first and third PCBs, 51 and 53 and the optical module 20 are flexibly assembled with the top housing 11. Thus, the stack connector 52b provided on the second PCB 52 is to be precisely mated with the connector on the host system.

Details of the optical source 1 according the present embodiment will be described as explaining a method to assemble the optical source 1.

Figure 3:
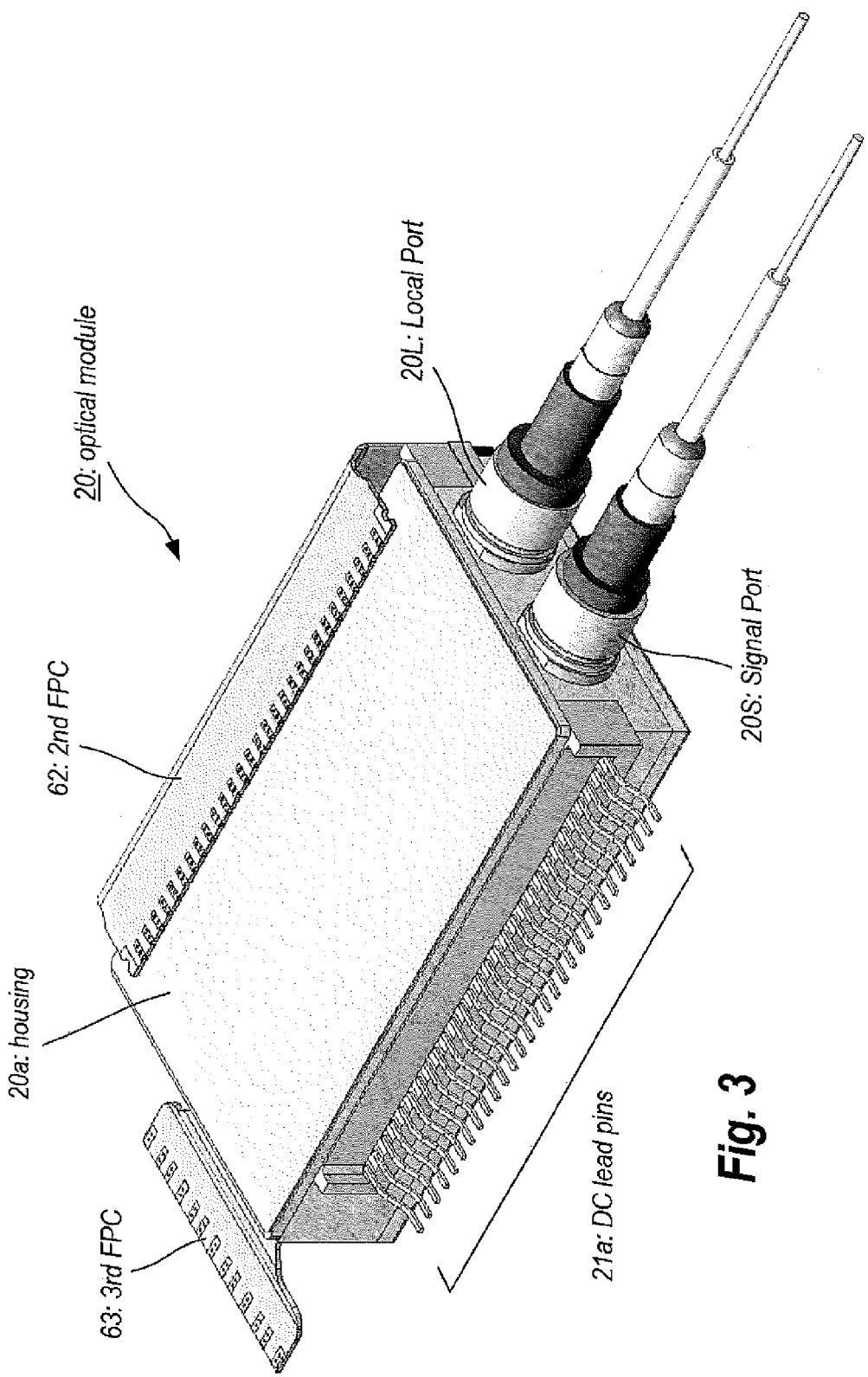
FIG. 3 shows an outer appearance of an optical module installed within the optical source shown in FIG. 1.

FIG. 3 shows an outer appearance of an optical module 20 installed within the optical source 1 shown in FIG. 1, where the optical module 20 accompanies the FPC boards, 62 and 63. The optical module 20 installed in the optical source 1 of the present embodiment has a box shaped housing 20a, and the first and second optical ports, 20S and 20L, in a front wall thereof. The former port 20S corresponds to the signal port to output a modulated signal beam; while, the second port 20L corresponds to the local port that outputs a continuous wave (CW) beam. The housing 20a further provides a plurality of lead pins, 21a and 21b, arranged in both side walls thereof and terminals 21c in the rear wall. The explanation below assumes that the "forward" or "front" corresponds to the direction where two optical ports, 20S and 20L, are arranged, and the "rear" corresponds to the opposite thereto.

Figure 4:
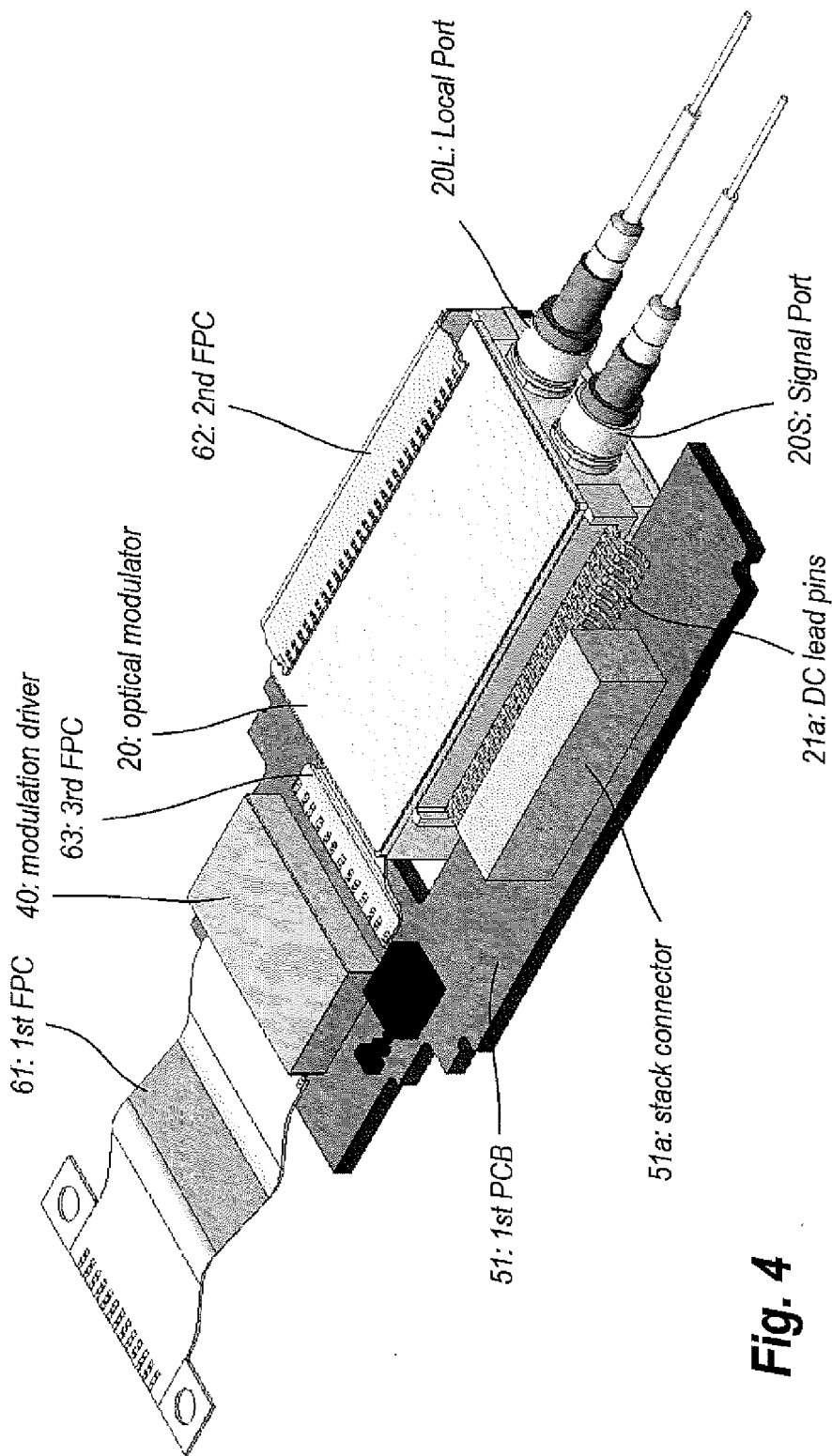
FIG. 4 shows the optical module electrically connected to a first printed circuit board (PCB) with FPC boards, where the first PCB accompanies the first FPC board that transmits RF signals provided to the optical module.

The lead pins, 21a and 21b, provided in both side walls carry DC signals, biases, or signals containing only low frequency components, but the terminals 21c provided in the rear wall carry signals containing high frequency components. The lead pins 21b provided in one of the side walls, which are hidden in FIG. 3, are connected to the second FPC board 62, and the terminals 21c in the rear wall are connected to the third FPC board 63. The lead pins 21a in another side wall are directly connected, or soldered to the first PCB 51 as shown in FIG. 4.

Figure 15:
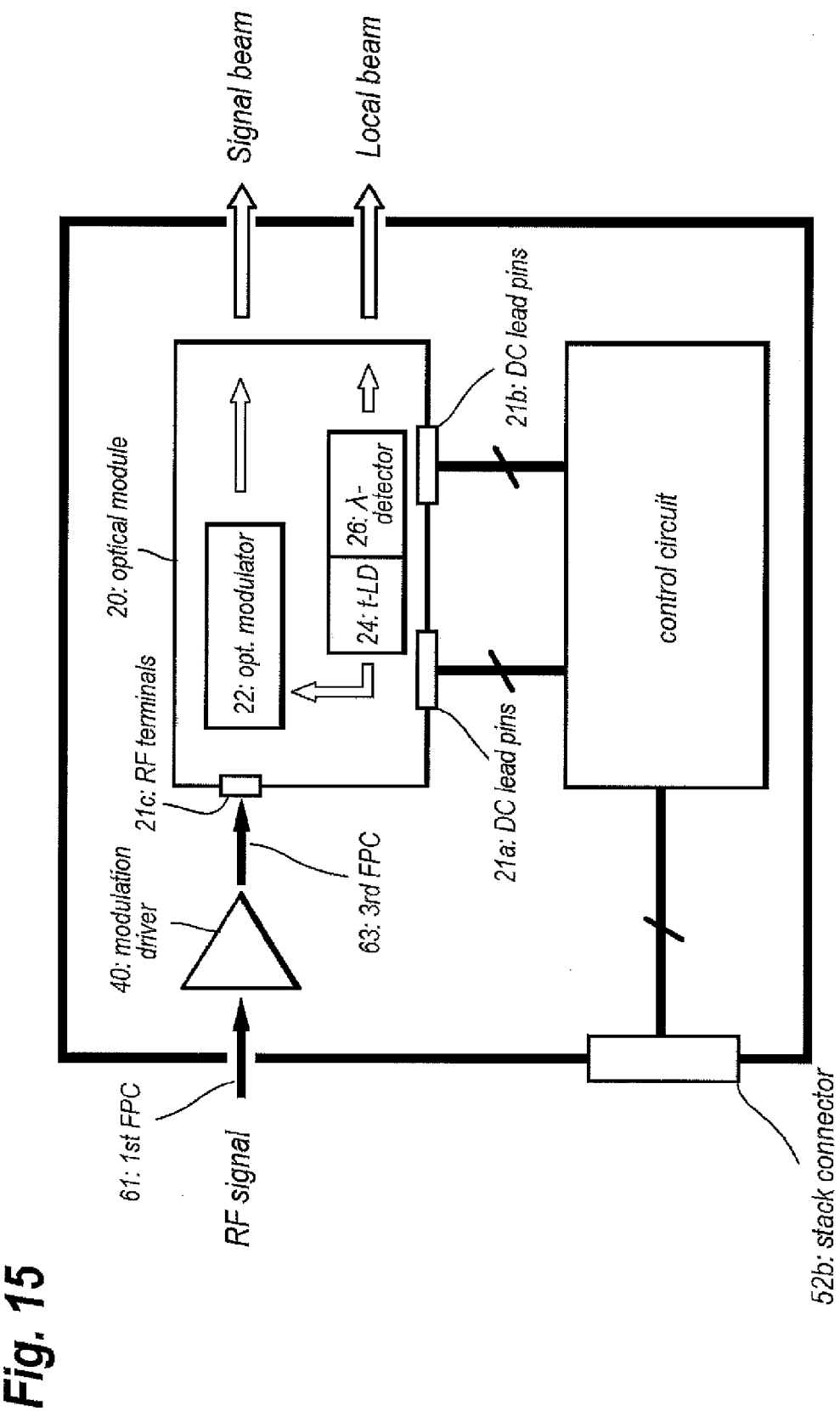
FIG. 15 schematically illustrates electronic diagram of the optical source.

FIG. 15 schematically illustrates an electronic diagram of the optical source 1 shown in FIG. 1. As described above, the optical module 20 shown in FIG. 3 electrically communicates with the outside through the DC lead pins, 21a and 21b, and the RF terminals 21c. That is, the optical module 20 outputs information concerning to a wavelength of the currently output beam, optical power of the currently output beams, which includes the optical power of the local beam and that of the modulated signal beam, temperatures of respective devices installed within the optical module 20, and so on.

On the other hand, the optical module 20 receives many control/bias signals to control the output optical power of the local beam and that of the modulated signal beam, target wavelengths of the optical beams, modulation strength, temperatures of respective devices, and so on. The total count of the control signals of the present optical module 20 is more than twenty (20) from the outside into the module, and more than ten (10) from the optical module 20 to the outside. In addition to those DC signals, the optical module 20 is necessary to be supplied with RF signals of four (4) each having differential signals, namely, eight (8) RF signals. Further, a number of grounds comparable to the sum of those DC and RF signals are necessary. Accordingly, the optical module 20 of the present embodiment provides total 80 DC lead pins, 21a and 21b, in both side walls of the housing 20a and total 16 RF terminals 21c in the rear wall.

Figure 16:
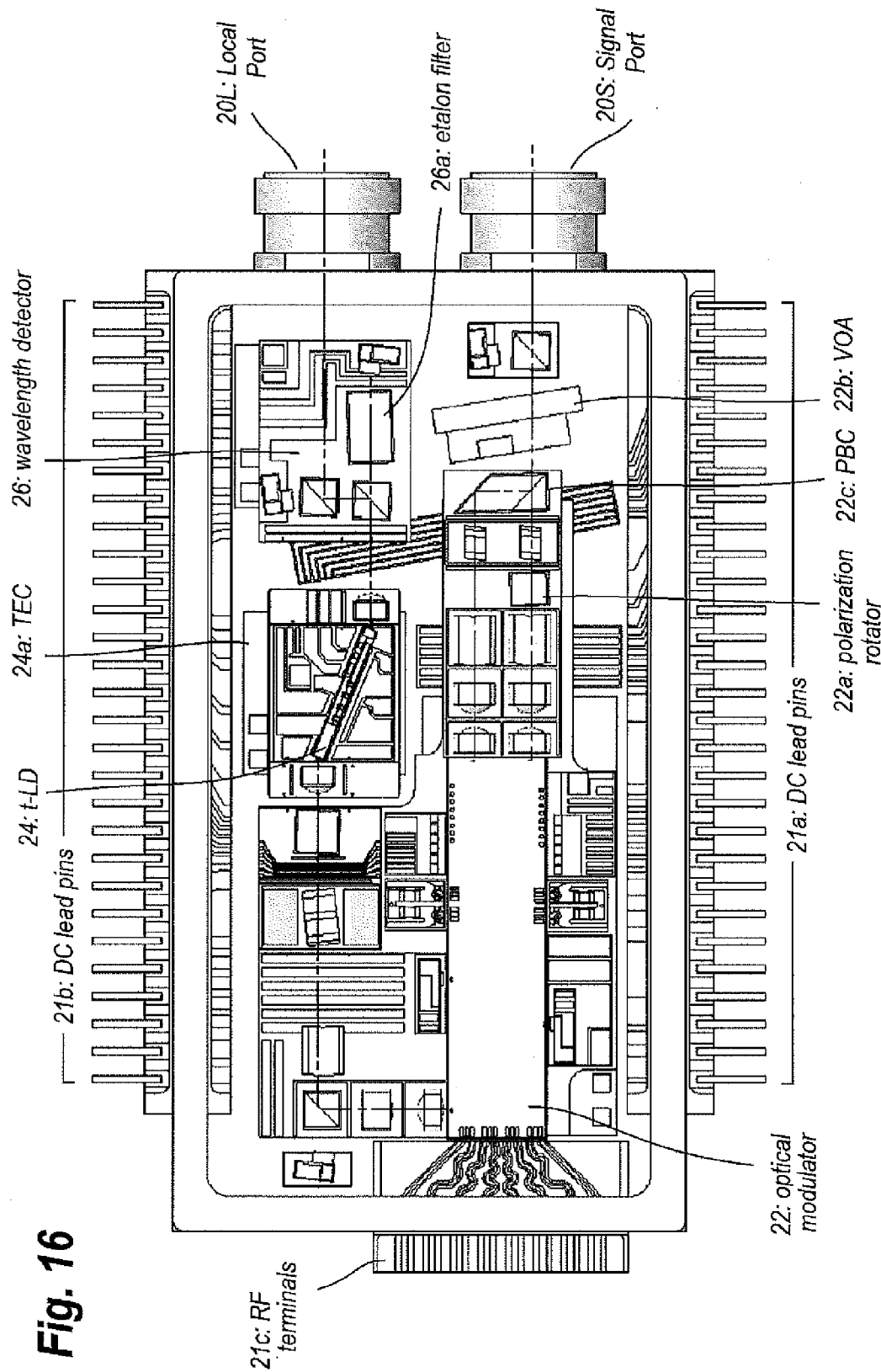
FIG. 16 shows an inside of the optical module installed in the optical source.

FIG. 16 schematically illustrates an inside of the optical module 20. As described above, the optical module 20 of the present embodiment installs an optical modulator 22 and a wavelength tunable LD (t-LD) 24 accompanied with a wavelength detector 26 within the housing 20a. The t-LD 24 and the wavelength detector 26 are arranged on a line close to one side wall, namely, along the line in parallel to the optical axis of the local port 20L. On the other hand, the optical modulator 22 is arranged along the other side, namely, along a line extended from the optical axis of the signal port 20S.

The optical module 20, in the present embodiment, has a type of the Mach-Zhender modulator, which provides two arm waveguides split from a single waveguide and combined into another single waveguide. Setting a phase difference of optical beams propagating in respective arm waveguides, the optical beam output from the combined waveguide is modulated. In order to set the phase difference of two optical beams each propagating in the respective arm waveguides, the arm waveguides are necessary to precisely adjust the phases of the respective optical beams. Thus, the Mach-Zhender modulator is supplied with two signals complementary to each other. The optical modulator 22 of the present embodiment implements four Mach-Zhender modulators in order to perform the dual polarization quadrature phase shift keying (DP-QPSK) modulation. Accordingly, eight RF signals, namely four differential RF signals, are supplied to the optical modulator 22. The optical modulator 22 outputs two modulated beams each having polarization same with each other. A polarization rotator 22a rotates one of the modulated beams, that is, the modulated beam output from the polarization rotator 22a has the polarization perpendicular to the polarization of the other modulated beam. A polarization beam combiner (PBC) 22c may combine those two modulated beams depending on the polarizations thereof. A variable optical attenuator (VOA) 22b may attenuate the thus polarization combined optical beam and output the attenuated beam from the signal port 20S.

The t-LD 24 is placed in diagonal to the optical axis of the local port 20L to suppress the beam output from the t-LD 24 from returning back to the t-LD 24. One of beams output from the t-LD 24 advances rearward and enters the optical modulator 22 from a side thereof after being reflected by a reflector. The other optical beam advancing toward the local port 20L passes the wavelength detector 26 and is output from the local port 20L after being reflected twice. The wavelength detector 26 provides an etalon filter 26a that has a specific transmittance. The wavelength of the optical beam currently output from the t-LD 24 may be determined by comparing the current transmittance, which is evaluated from an optical beam not passing the etalon filter and another optical beam passing through the etalon filter, with the designed transmittance of the etalon filter 26a. The wavelength of the t-LD 24 may be controlled such that the current transmittance of the etalon filter 26a coincides with the designed transmittance thereof at the target wavelength by supplying various biases, for example, more than five biases, to the t-LD 24. Accordingly, the optical module 20 of the present embodiment is necessary to be supplied with more than thirty (30) biases and the eight RF signals.

Referring again to the explanation of the optical source 1, FIG. 4 shows the optical module 20 electrically connected with the first PCB 51 and with the second and third FPC boards, 62 and 63. The first FPC board 61 transmits the RF signals supplied to the optical module 20. The first PCB 51 has a plane shape of L-character, where the optical module 20 is set in a space surrounded by two bars of L-character, namely, the vertical bar and the bottom bar. The first PCB 51 mounts the modulation driver 40 on the vertical bar of the L-character and the stack connector 51a to be connected to the second PCB 52 on the bottom bar of L-character. The third FPC board 63 brought out from the rear of the optical module 20 is connected to the first PCB 51 at a position in front of the modulation driver 40. The RF signals to be supplied to the modulation driver 40 are provided through the first FPC board 61 connected to the first PCB 51 in the rear of the modulation driver 40. The lead pins 21a provided in one side wall of the optical module 20 are directly connected to the first PCB 51 in the bottom bar of L-character. The optical module 20 is assembled with the first PCB 51 to form an intermediate assembly; specifically, before the optical module 20 and the first PCB 51 are assembled with the top housing 11, the second and third FPC boards, 62 and 63, are soldered to the DC lead pins 12b and the RF terminals 21c of the optical module 20, and the thus assembled optical module 20 is fixed to the first PCB 51, which mounts the first FPC 61, the modulation driver 40, and the stack connector 51a thereon, by soldering the DC lead pins 21a to the first PCB 51.

Figure 5:
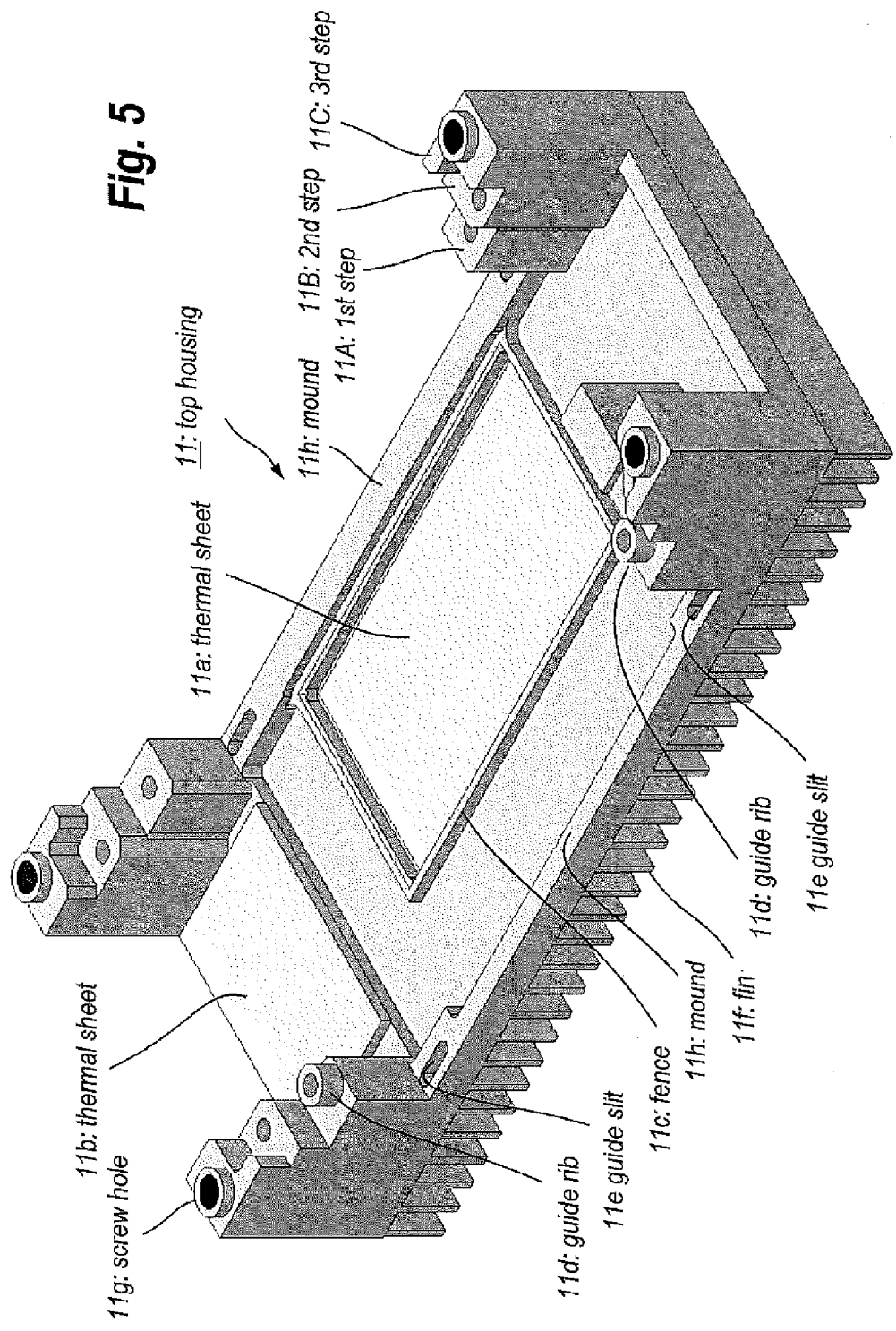
FIG. 5 is a perspective view of a top housing attaching thermal sheets thereto, where the thermal sheets are provided in places where the optical module and a modulation driver are to be mounted, respectively.

FIG. 5 is a perspective view of an inside of the top housing 11 that attaches thermal sheets, 11a and 11b, to places where the optical module 20 and the modulation driver 40 are to be mounted, respectively. The top housing 11 has a plane portion and four posts in respective corners of the plane portion. The plane portion provides a fence 11c with a frame shape to define an area where the optical module 20 is to be mounted. The area surrounded by the fence 11c is provided with the thermal sheet 11a that is attached to the bottom of the optical module 20 to secure a heat-dissipating path from the optical module 20 to the top housing 11. The top housing 11 further provides fins 11f in an outer surface thereof. The heat conducted from the optical module 20 through the thermal sheet 11a may be effectively radiated outside through the fins 11f. The top housing 11 further provides another thermal sheet 11b in an area which corresponds to an area of the first PCB 51 where the modulation driver 40 is to be mounted thereon. The modulation driver 40 also generates heat to be preferably dissipated outside of the optical source 1. Accordingly, the top housing 11 provides the thermal fins 11f in the outer surface thereof.

The four posts provided in respective corners each has three steps. The lowest step, the first step, is provided for mounting the second PCB 52 thereon, the second step mounts the bottom housing 12, and the third step faces the host board. Because the present optical source 1 needs to define the position of the second PCB 52 relative to the top housing 11, a half of the first steps 11A in respective posts provide guide ribs 11d that guide the second PCB 52. Details of the guide ribs 11d and the second PCB 52 will be described later. Rest two first steps 11A provide only screw holes to receive the screws for fastening the second PCB 52 to the top housing 11. The top housing 11 also provides mounds 11h in respective sides of the plane portion to mount the first PCB 51 thereon. The mounds 11h provide guide slits 11e into which legs 35 of the holder 30 are to be inserted.

Figure 6:
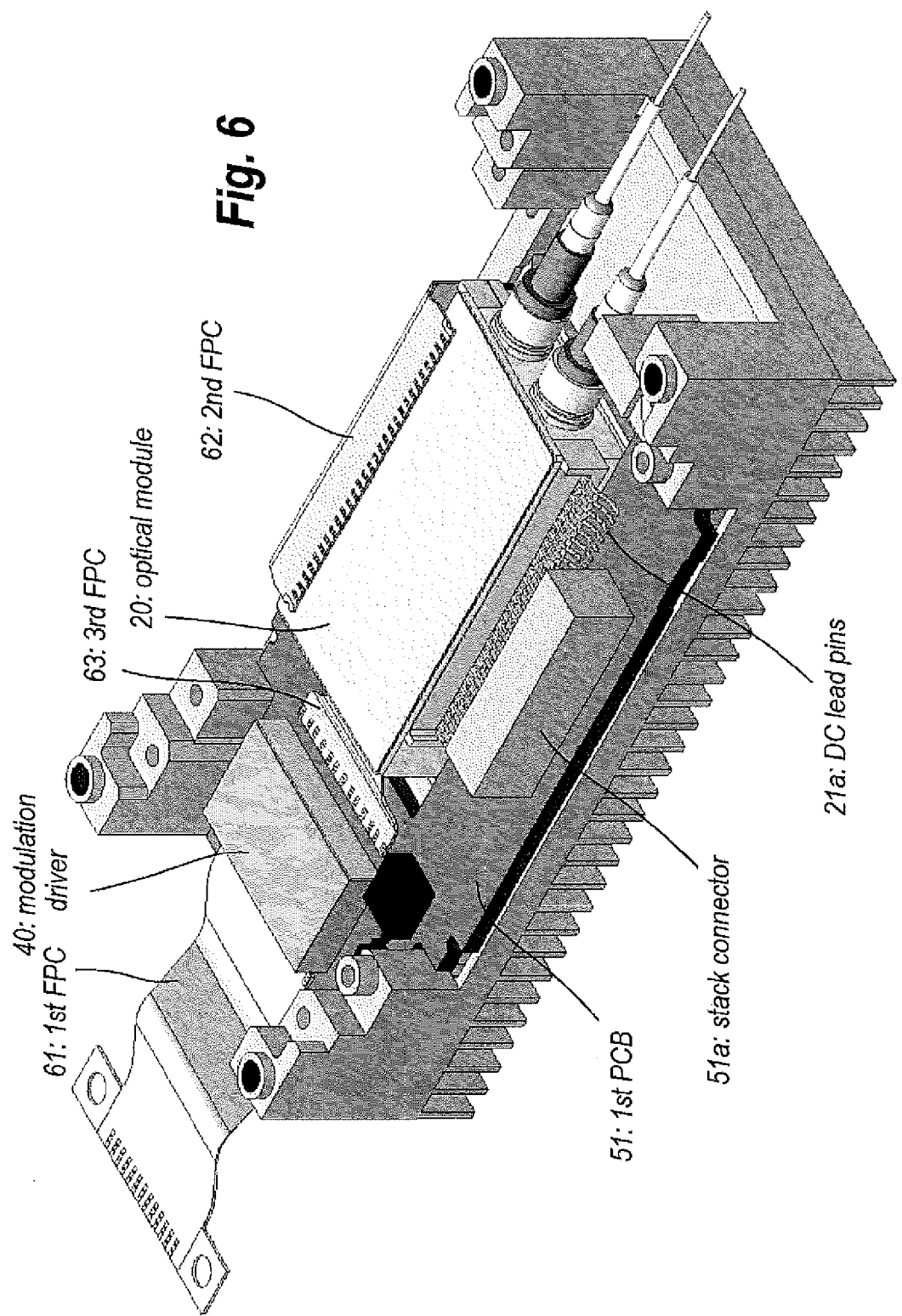
FIG. 6 is a perspective view of an inside of the top housing that mounts the optical module and the first PCB, where the first PCB is mounted on mounds in respective sides of the top housing without any screws.

FIG. 6 is a perspective view of the top housing 11 mounting the optical module 20 and the first PCB 51 on the mounds 11h. Because the thermal sheets, 11a and 11b, are made of a gelled material applied on the top housing 11 thick enough for the first PCB 51 to be apart from the top housing 11 when no pressure is caused to the optical module 20. That is, the first PCB 51 is floated from the top housing 11 only by placing the optical module 20 on the thermal sheet. Next process will fasten the optical module 20 and the first board 51 with the top housing 11.

Figure 7:
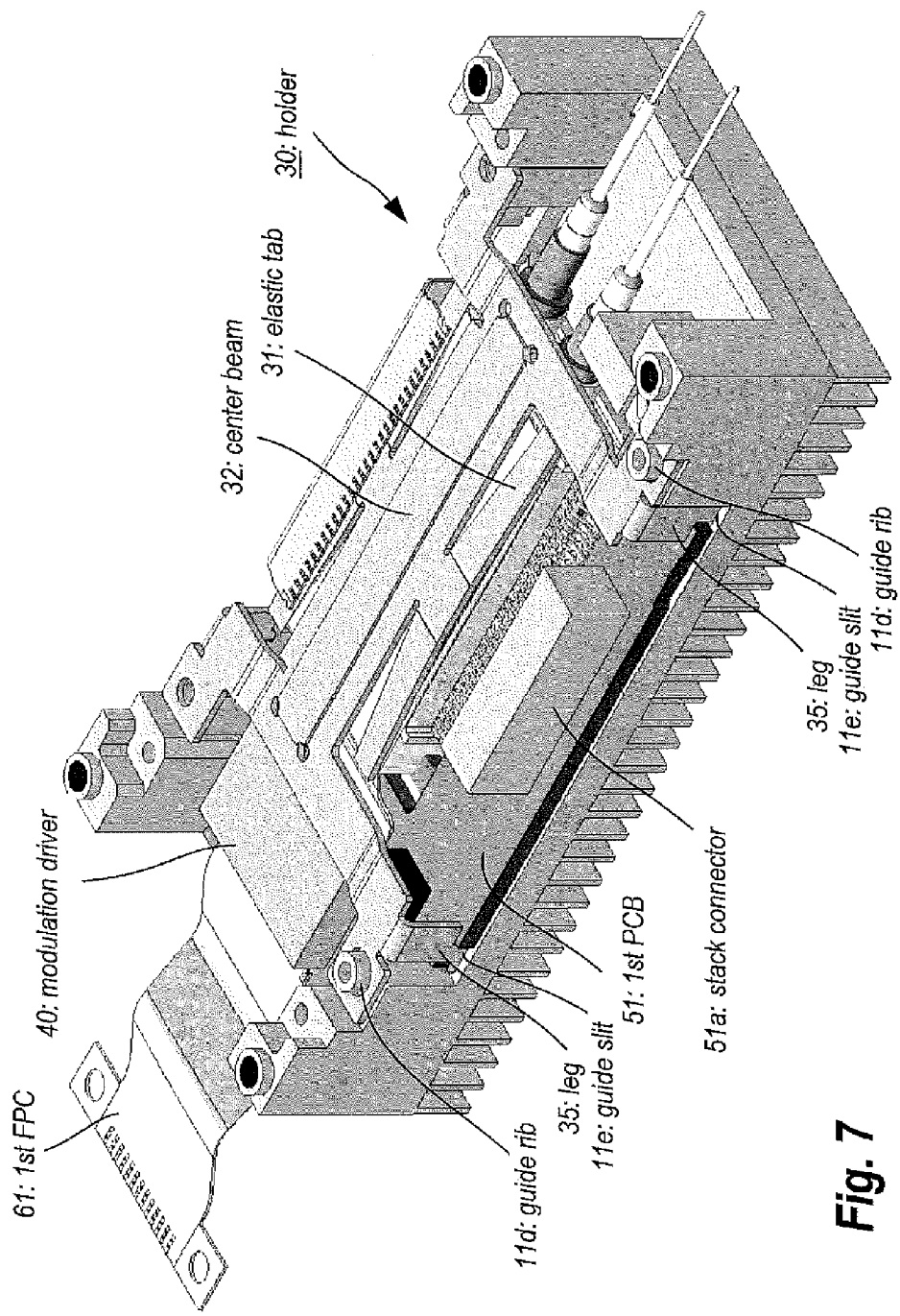
FIG. 7 is a perspective view of a holder assembled on first steps of the top housing, where the holder pushes the optical module toward the top housing to secure a heat dissipating path thereto.

FIG. 7 is a perspective view of a holder 30 assembled on the first steps 11A as pushing the housing 20a of the optical module 20. That is, after placing the first PCB 51 on the mounds 11h of the top housing 11 as placing the optical module 20 on the thermal sheet 11a, setting holder 30 on the optical module 20, and fastening the second PCB 52 together with the holder 30 to the top housing 11, not only the second PCB 52 but the optical module 20 and the first PCB 51 are tightly mounted on the top housing 11.

Figure 13:
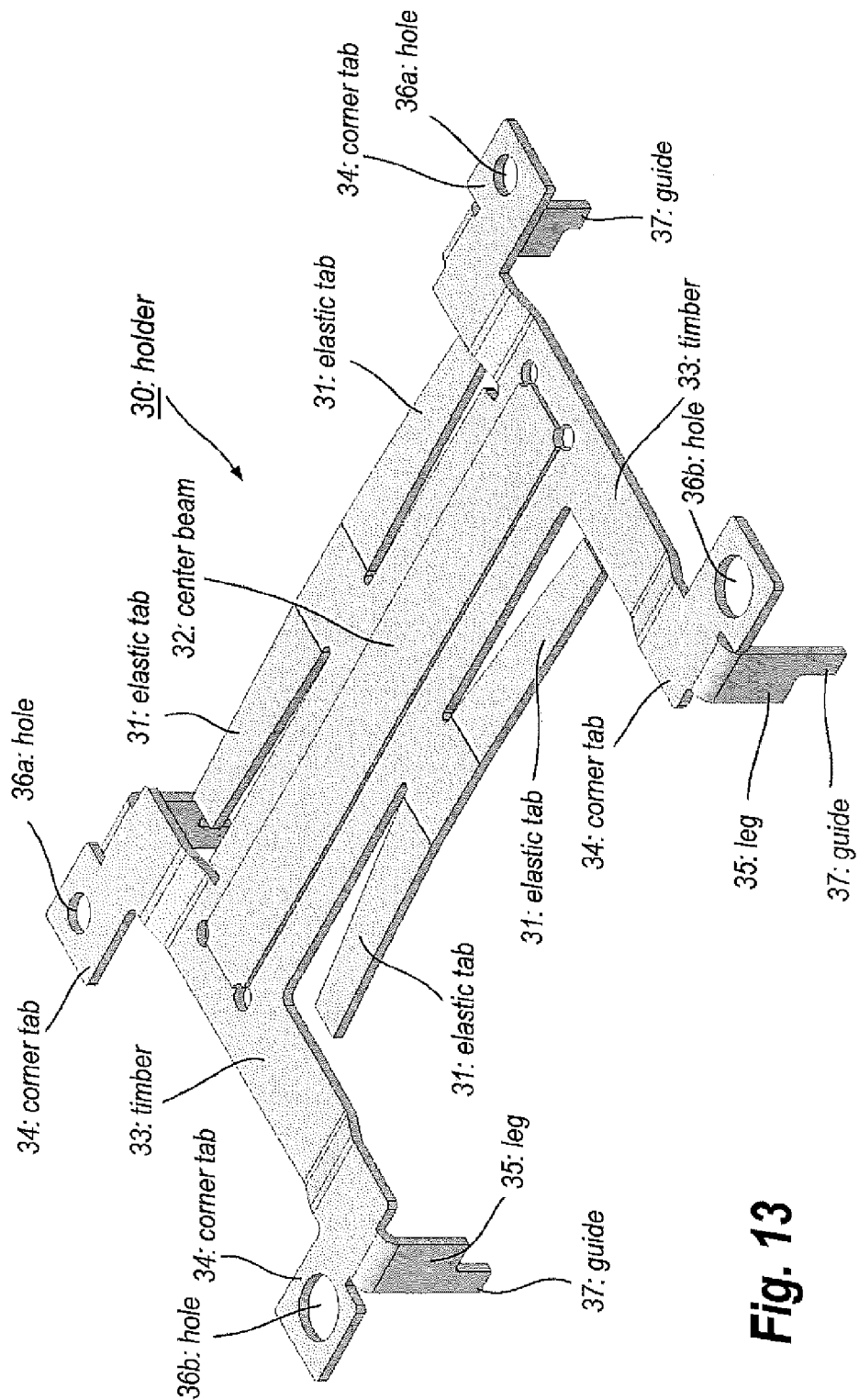
FIG. 13 is a perspective view of the holder.

FIG. 13 is a perspective view of the holder 30. The holder 30 provides a center beam 32, front and rear timbers 33, four elastic tabs 31 extending from the center beam 32, four corner tabs 34 provided in respective ends of the front and rear timbers 33, four legs 35 bent downward from respective corner tabs 34, and four guides 37 provided in respective ends of the legs 35. The elastic tabs 31 extend from an intermediate of the center beam 32 and slightly bent downward. Accordingly, only end portions of the elastic tabs 31 are in contact with the housing 20a of the optical module 20.

The front and rear timbers 33 in respective center portions thereof are bent downward from which the center beam 22 extends, which enhances the toughness against the stress caused by pressing the optical module 20 by the ends of the elastic tabs 31. Respective ends of the front and rear timbers 33 bent upward provide the corner tabs 34 with holes, 36a and 36b, in respective centers thereof. Two holes 36b have a diameter greater than a diameter of rest two holes 36a. The guide ribs 11d provided in the first steps 11A in a half of the corner positions of the top housing 11 are inserted into the holes 36b with the greater diameter. Thus, this arrangement of the holes 36b and the guide ribs 11d in the half of the first steps 11A, and the holes 36a and the screw holes in the rest of the first steps 11A may automatically and precisely determine the relative position of the holder 30 and the top housing 11. The guides 37 provided in respective legs 35 are inserted into the guide slits 11e provided in the mounds 11h of the top housing 11 and the edges of the legs 35 press the first PCB 51 against the mounds 11h.

Figure 8:
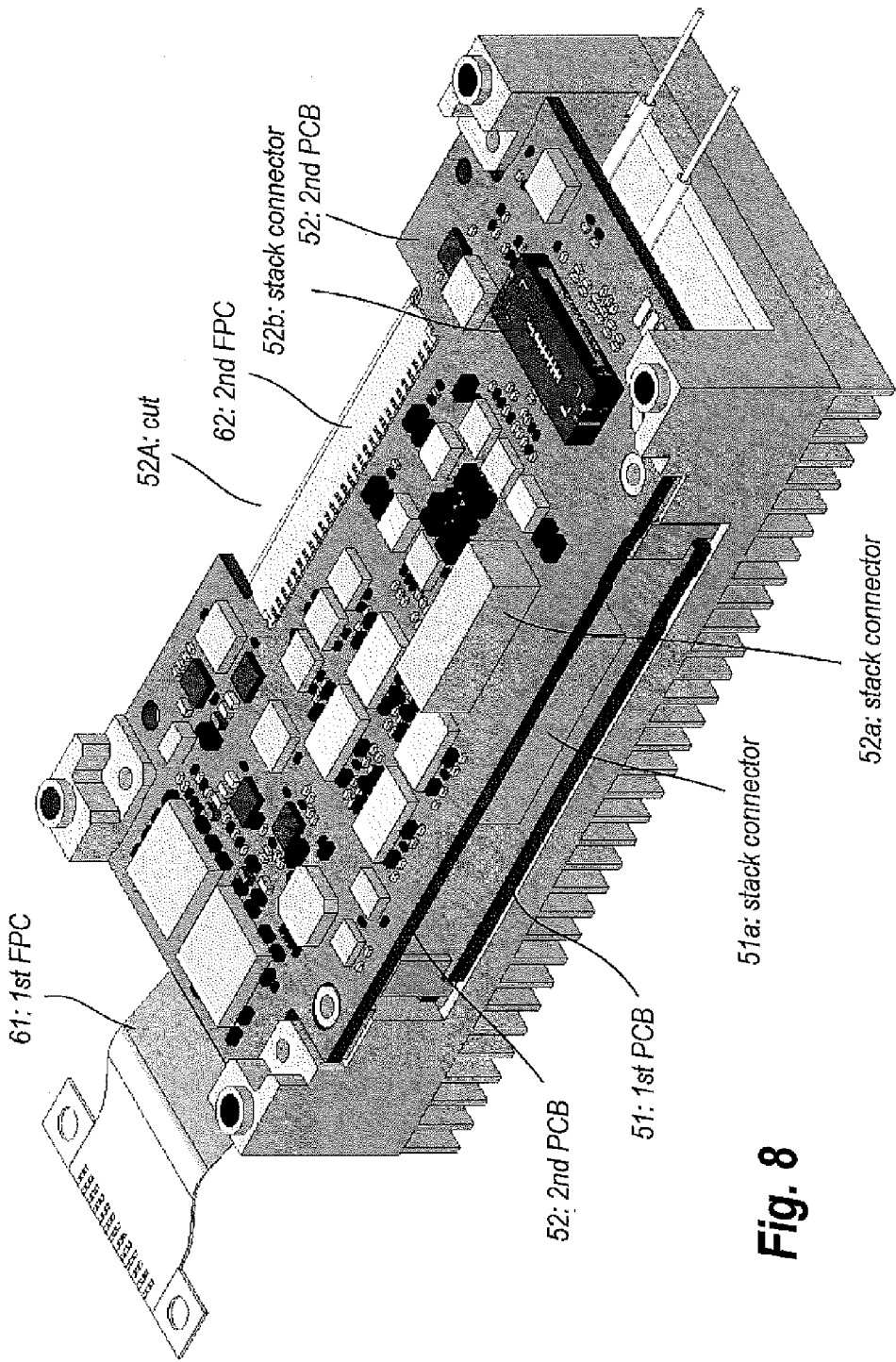
FIG. 8 is a perspective view of a second PCB mounted on the first steps of the top housing as sandwiching the holder.
Figure 14:
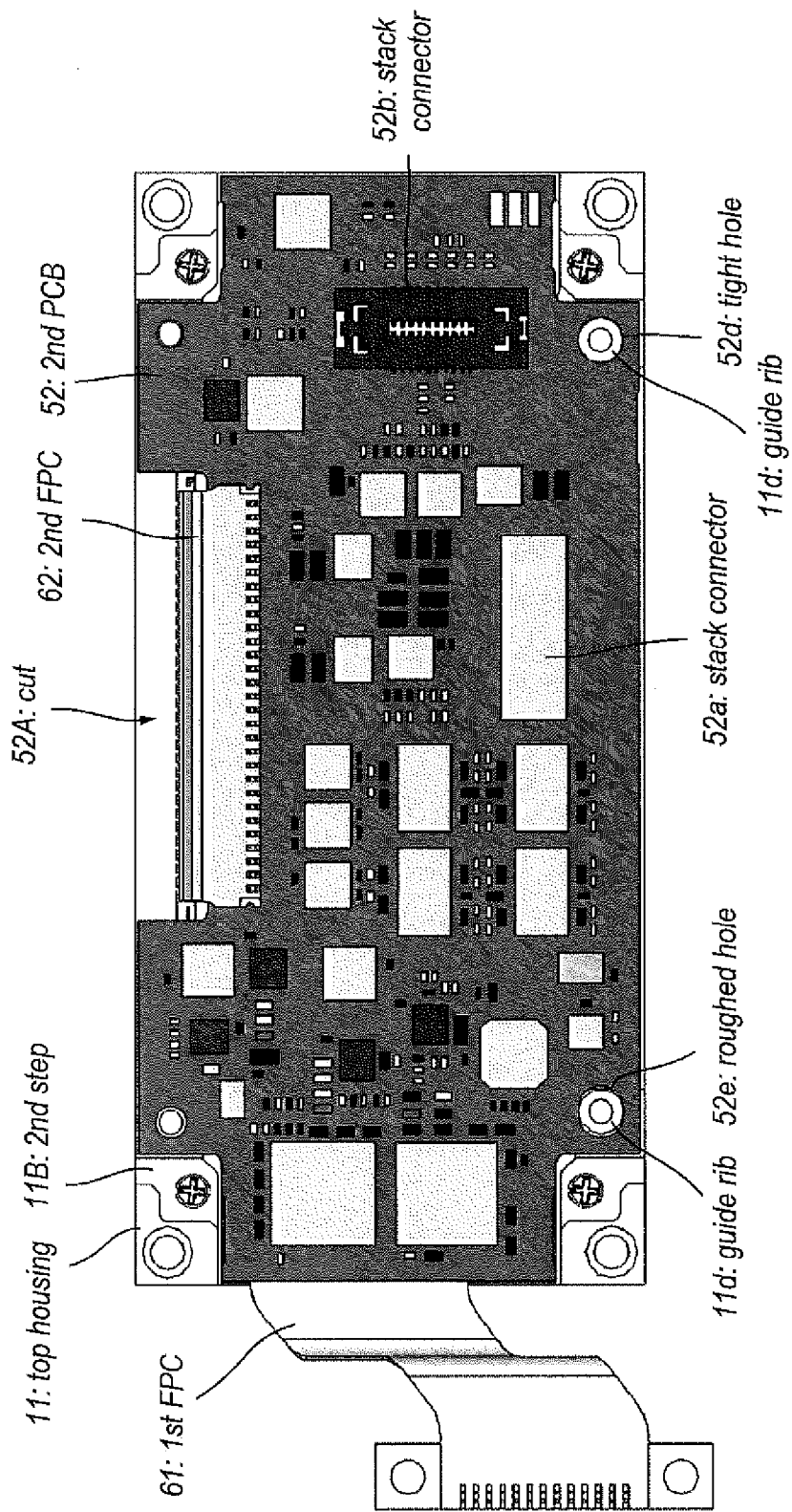
FIG. 14 is a top view of the second PCB that mounts the stack connector to be connected to the host connector.

FIG. 8 is a perspective view of the second PCB 52 mounted on the top housing 11, where the top housing 11 assembles the holder 30 shown in FIG. 7 under the second PCB 52. After placing the holder 30 on the first steps 11A of respective corner posts of the top housing 11, the second PCB 52 is set on the first steps 11A as receiving the guide ribs 11d of the first steps 11A within two holes, 52d and 52e, of the second PCB 52. FIG. 14 is a plan view of the second PCB 52 that mounts the stack connector 52b to be connected to the host connector. As shown in FIG. 14, the second PCB 52 provides a tight hole 52d in one side and a roughed hole 52e in the other side. The tight hole 52d fits with the guide rib 11d provided on the first step 11A, while, the roughed hole 52e has an extended circular shape. The engagement of the guide rib 11d with the tight hole 52d may define the positional relation of the stack connector 52b for the outside with the top housing 11, namely, the positions of the screw holes provided in the third steps 11C of the corner posts. The roughed hole 52e may securely fix the second PCB 52 with the top housing 11.

The second PCB 52, as shown in FIG. 14, has a cut 54 in one side thereof, through which the second FPC 63 extends upward from the optical module 20 to the top surface of the second PCB 52. That is, the edge of the cut 52A is aligned with the side of the optical module 20. Accordingly, the second FPC 62 is directly connected to the DC pins 21b of the optical module 20. Another side of the second PCB 52 opposite to the cut 54 mounts another stack connector 52a that is connected to the third PCB 53.

Figure 9:
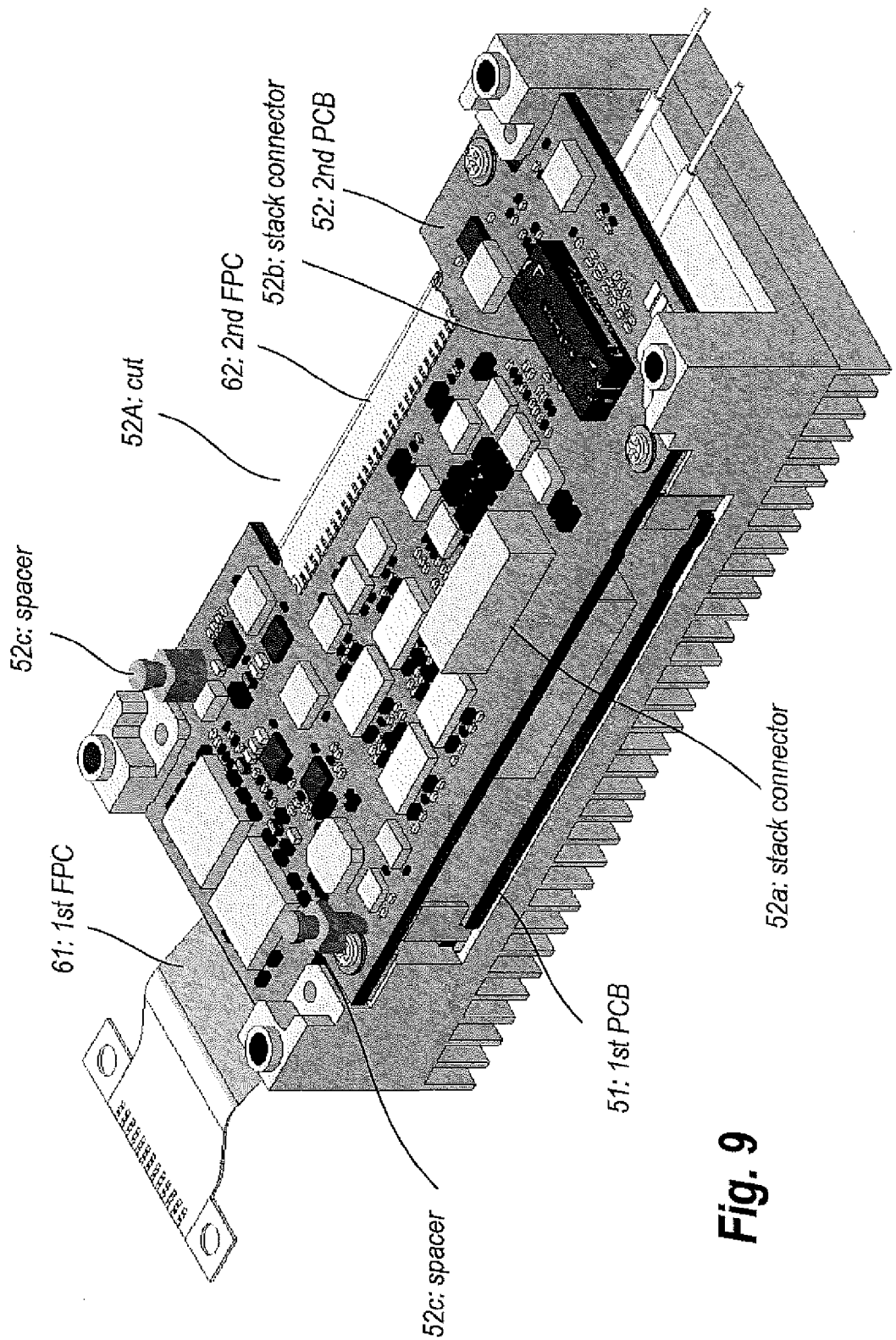
FIG. 9 is a perspective view of the second PCB shown in FIG. 8 accompanied with spacers and a stack connector thereon that assembles a third PCB 53 thereon, where the second PCB also mounts another stack connector to be connected to a circuit board of the host system.

Referring to FIG. 9, the second PCB 52 mounted on the first steps 11A of the corner posts attaches spacers 52c in positions close to the rear corner posts. As described above, the second PCB 52 mounts the stack connector 52a along the edge thereof. The spacers 52c have a height corresponding to a thickness of the stack connector 52a to level the third PCB 53 mounted on the spacers 52c.

Figure 10:
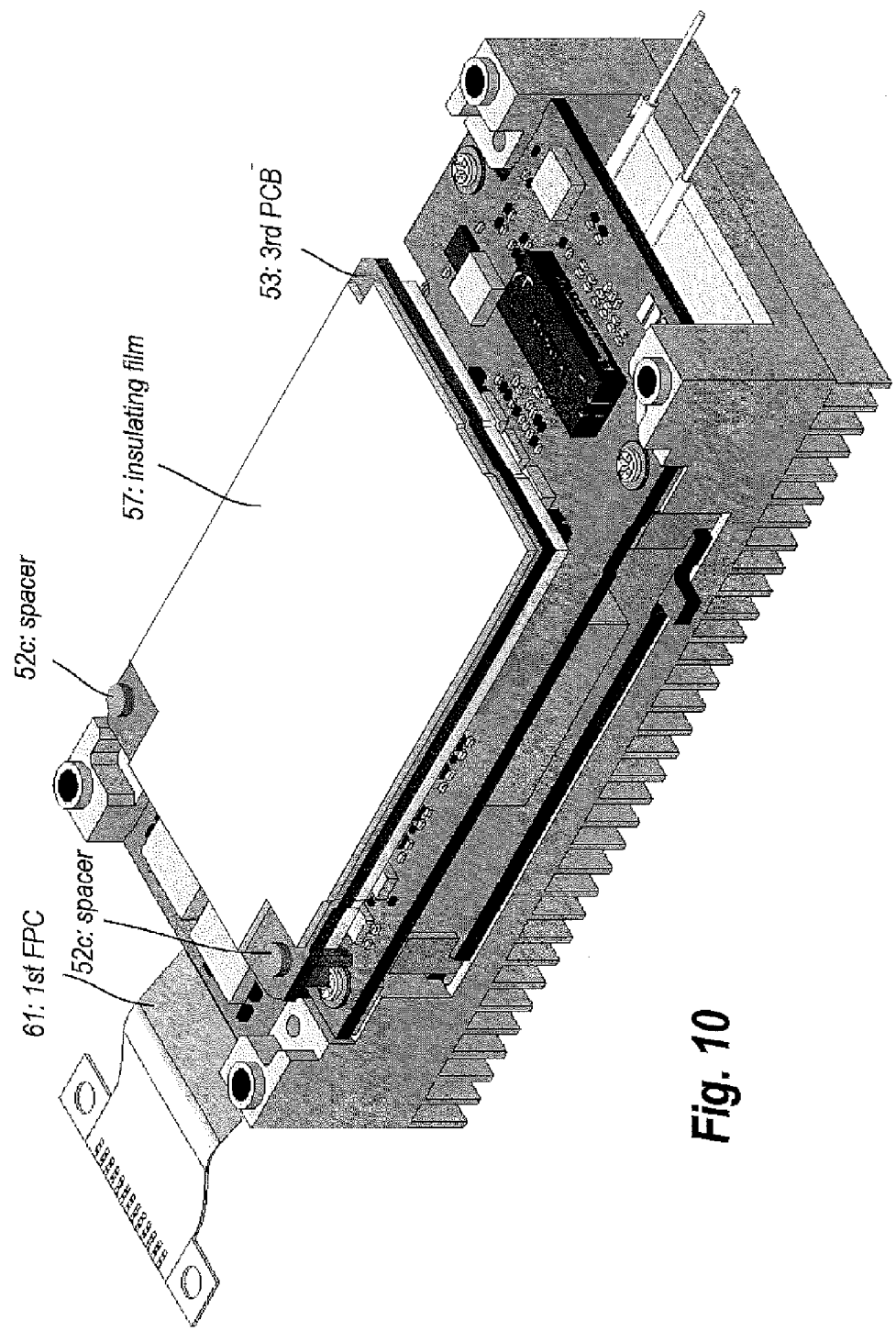
FIG. 10 is a perspective view of the third PCB mounted on the second PCB as putting the spacers and the stack connector therebetween, where the third PCB provides an insulating film thereon such that the third PCB 53 with the insulating film exposes the stack connector to be connected to the host connector.

FIG. 10 is a perspective view of the third PCB 53 mounted on the second PCB 52 as putting the spacers 52c and the stack connector 52a therebetween, where the third PCB 53 provides an insulating film 57 thereon. As shown in FIG. 10, the third PCB 53 has a longitudinal length shorter than a longitudinal length of the second PCB 52 such that the third PCB 53 exposes the stack connector 52b mounted on the second PCB 52. The insulating film 57 on the third PCB 53 may electrically isolate the components on the third PCB 53 from the bottom housing 12. That is, the insulating film 57 may prevent the components on the third PCB 53 from making short-circuit to the bottom housing 12. Only the stack connector 52a and the spacers 52c fix the third PCB 53 to the second PCB 52. No screws or no latching mechanisms are provided in the present optical source 1 to fix the third PCB 53 to the second PCB 52.

Figure 11:
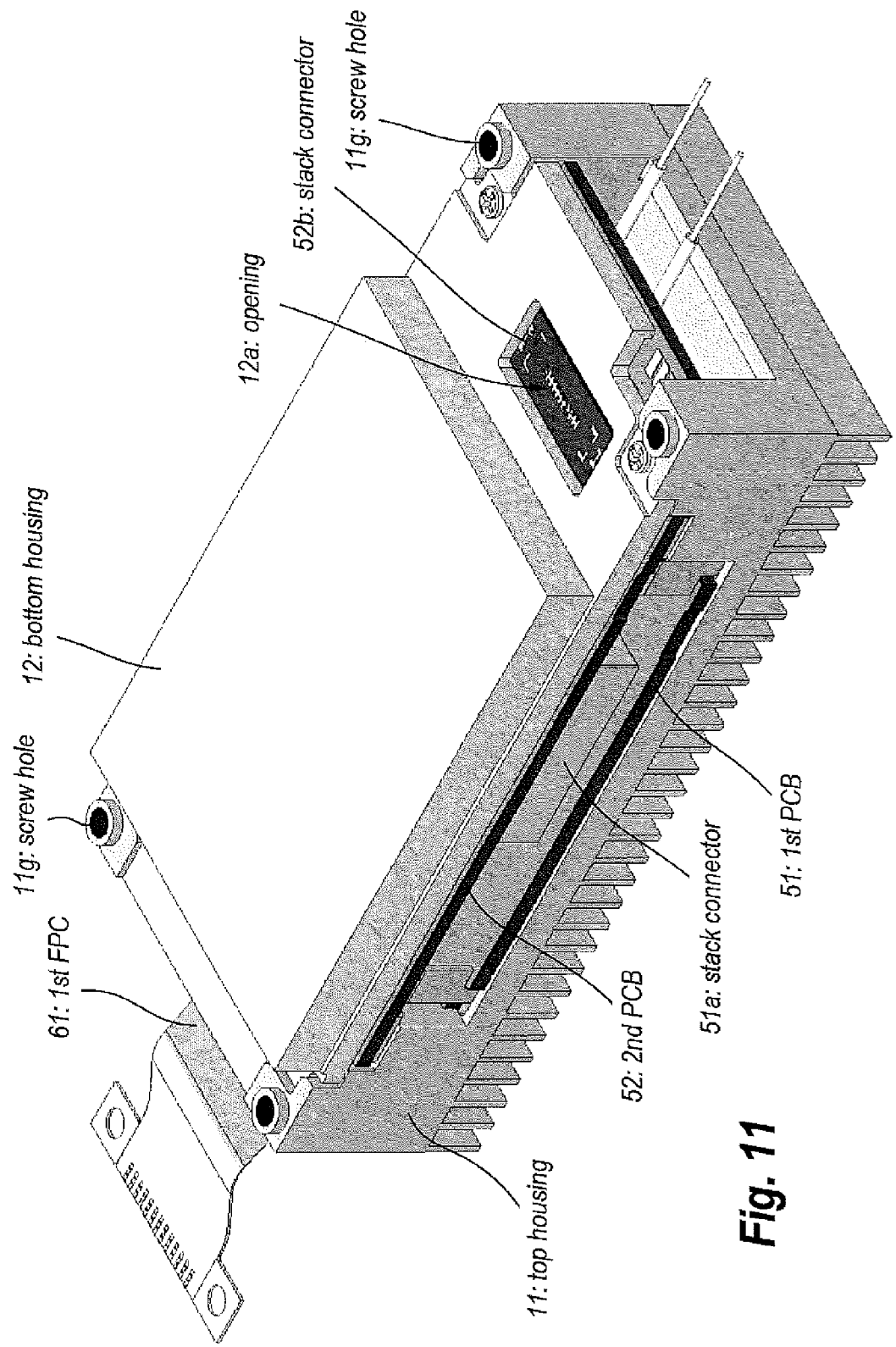
FIG. 11 is a perspective view of the optical source with a bottom housing that covers the third PCB as exposing the stack connector to be connected to the host connector within the opening provided in the bottom housing.

Finally, FIG. 11 is a perspective view of the optical source 1 with the bottom housing 12 that covers the third PCB 53. As shown in FIG. 11, the bottom housing 12 has steps. The lower step provides an opening 12a to expose the stack connector 52b mounted on the second PCB 52. The upper step covers the third PCB 53. The bottom housing 12 is fixed on the second steps 11B of respective corner posts of the top housing 11 such that the bottom housing 12 exposes the third steps. The bottom housing 12 in portions corresponding to the corner posts have a thickness corresponding to steps between the second steps 11B and the third steps 11C of the corner posts.

Figure 12:
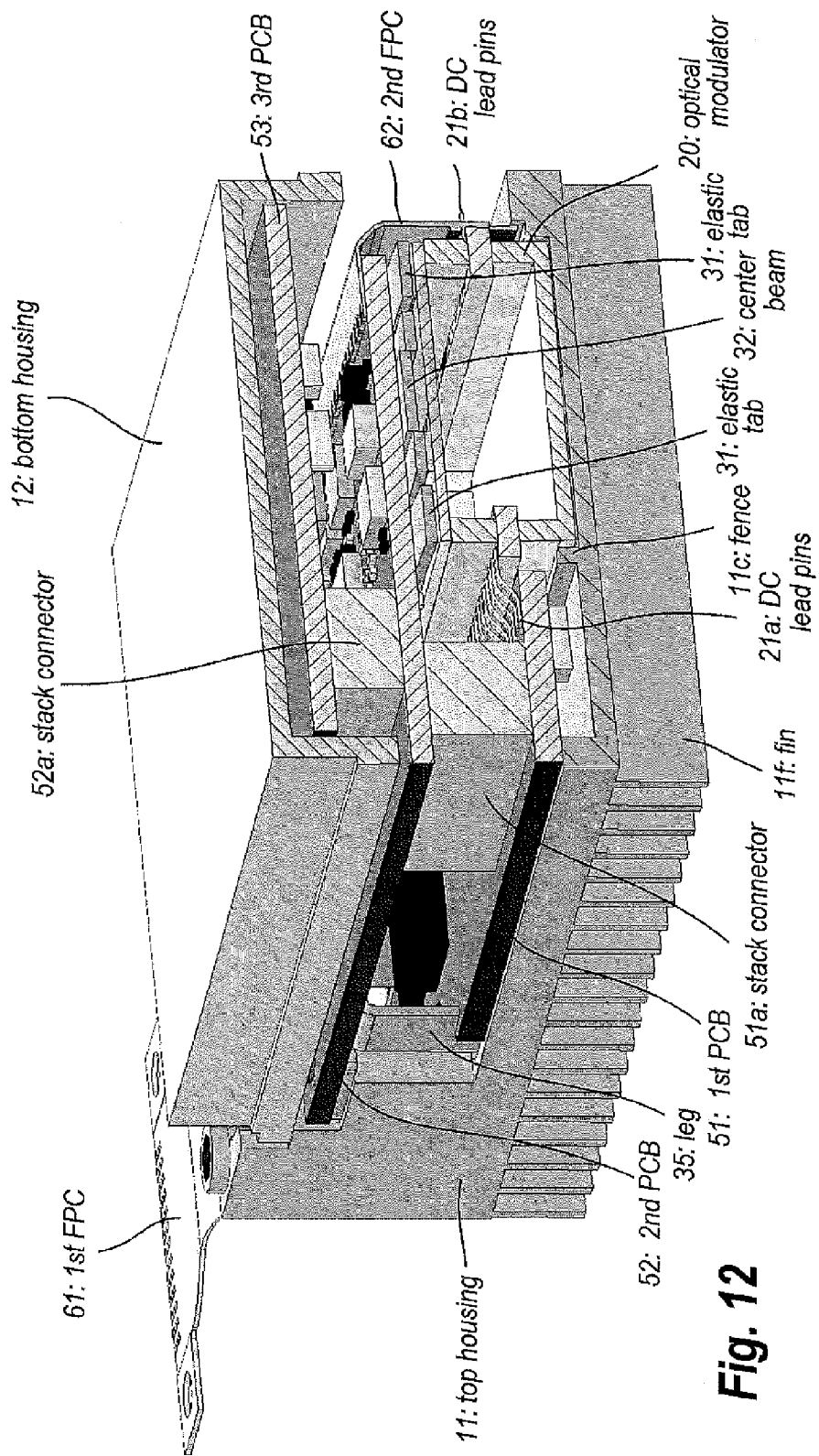
FIG. 12 shows a cross section of the optical source taken along the lateral direction thereof.

FIG. 12 shows a cross section of the optical source 1 taken along the lateral direction. In the optical source 1 of the present embodiment, the top housing 11 mounts the optical module 20 thereon through the thermal sheet 11a. The holder 30 pushes the optical module 20 against the top housing 11 by being pushed downward from the second PCB 52, which is rigidly fixed to the top housing 11 in the first steps 11A of respective corner posts. Concurrently with the pushing of the optical module 20, the holder 30 also pushes the first PCB 51 against the top housing 11 by the edges provided in the legs 35 thereof. Inserting the guides 37 of the legs 35 into the guide slits 11e, the edges of the legs 35 abut against the first PCB 51 and push the first PCB 51 against the mounds 11h of the top housing. Thus, the optical module 20 and the first PCB 51 are assembled with the top housing 11 through the second PCB 52.

Also, the third PCB 53 is assembled with the stack connector 52a between the second PCB 52 and the third PCB 53. Accordingly, the third PCB 53 is also assembled with the top housing 11 through the second PCB 52. Only the second PCB 52 is rigidly fixed to the top housing 11, and only the second PCB 52 mounts the stack connector 52b connected to the host board. Thus, mounting the top housing 11 on the host board by receiving screws in respective screw holes 11g in the third steps 11C of the corner posts, the relative position of the stack connector 52b with respect to the top housing 11 or the host board may be automatically defined.

FIG. 17A is a perspective view of an optical source modified from the optical source shown in FIG. 1, and FIG. 17B shows a cross section taken along a longitudinal axis of the optical source extending in parallel to the optical axis of the local port and the signal port. The optical source 1 shown in FIG. 17A provides a fiber protector 15 between the top housing 11 and the bottom housing 12. Two fibers extending from the local port 20L and the signal port 20S of the optical module 20 pass through the fiber protector 15. The fiber protector provides a curved front surface with a curvature thereof which is smaller than a critical curvature for an optical fiber. When an optical fiber is bent with a curvature greater than the critical one, transmission loss, exactly the bending loss drastically increases to be unable to transmit an optical signal. The optical source 1 shown in FIG. 1 has a possibility for fibers extracted therefrom to be bent at an edge of the top housing 11 or the bottom housing 12 by a curvature greater than the critical curvature. The fiber protector 15 of the present modification, which is set in the opened output port and has the curved front surface formed continuous from the edge of the housing 10, may effectively prevent the fibers from being bent by a curvature greater than the critical one.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An optical source mounted on a host system, comprising:
    an optical module that installs a semiconductor laser diode (LD) and an optical modulator;
    circuits that drive the LD and the optical modulator;
    printed circuit boards (PCBs) that mount the circuits thereon, the PCBs being electrically connected through a surface mountable connector therebetween;
    a housing that installs the optical module and the PCBs therein,
    wherein one of the PCBs is configured to mount another surface mountable connector that is connectable to the host system and to be rigidly fixed to the housing, and
    wherein the optical module and the PCBs other than the one of the PCBs configured to be rigidly fixed to the housing are flexibly mounted on the housing.

2. The optical source of claim 1,
    further including a holder fixed to the housing,
    wherein the holder pushes the optical module against the housing.

3. The optical source of claim 2,
    further including a thermal sheet provided between the optical module and the housing, the thermal sheet being made of elastic material.

4. The optical source of claim 1,
    wherein the optical module is electrically connected to the one of the PCBs configured to be rigidly fixed to the housing through a flexible printed circuit (FPC) board, and to the other of the PCBs by lead pins provided in the optical module.

5. The optical source of claim 1,
    further including a modulation driver that drives the optical modulator installed within the optical module,
    wherein the modulation driver is mounted on one of the other of the PCBs, and
    wherein the optical modulator provides a flexible printed circuit (FPC) board electrically connected to the modulation driver.

6. The optical source of claim 1,
    wherein the housing includes a top housing rigidly fixed to the host system and a bottom housing,
    wherein the top housing and the bottom housing sandwich the optical module, the PCBs, and the surface mountable connector therebetween, and
    wherein the bottom housing covers the PCBs.

7. The optical source of claim 6,
    wherein the PCBs include a first PCB and a second PCB, the second PCB is rigidly fixed to the top housing and provides the another surface mountable connector connectable to the host system.

8. The optical source of claim 7,
    further including a holder provided between the second PCB and the top housing, the holder pushing the optical module against the top housing.

9. The optical source of claim 8,
    wherein the holder provides a center beam, elastic tabs, and corner tabs, the elastic tabs each extending from the center beam and pushing the optical module against the top housing, the corner tabs providing legs pushing the first PCB against the top housing.

10. The optical source of claim 7,
    further including a thermal sheet provided between the optical module and the top housing, the thermal sheet being made of elastic material.

11. The optical source of claim 1,
    wherein the LD installed within the optical module is a wavelength tunable laser diode.

12. The optical source of claim 1,
    wherein the optical modulator is a type of a Mach-Zehnder modulator made of semiconductor material.

* * * * *